No. 737,055.                                                   Patented August 25, 1903.

UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 737,055, dated August 25, 1903.

Application filed August 25, 1902. Serial No. 120,998. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in compositions of matter to be used for pigments and in the process of making the same; and it consists, respectively, in the novel product and in the new steps more fully set forth in the specification and pointed out in the claims.

The composition consists of an intimate mixture of the precipitates of zinc carbonate and barium sulfate with or without an admixture of precipitated zinc sulfid and in proportions determined by the molecular combination of the soluble salts from which the precipitates are derived.

In the preparation of my composition I employ mixtures of solutions of zinc sulfate, the carbonate of an alkali metal, and a salt of barium, first mixing the zinc salt with the alkali carbonate, whereupon there is precipitated the zinc carbonate, leaving the sulfate of the alkali metal in solution. To the latter is then added a soluble barium salt, when there is precipitated on top of the carbonate barium sulfate, leaving in solution the sulfid of the alkali metal. To this sulfid may be again added a sulfate of zinc, when zinc sulfid will be precipitated, leaving the sulfate of the alkali metal in solution.

As an illustration of the general principle here enunciated I prepare five molecular equivalents of an aqueous solution of zinc sulfate, to which I add five equivalents of sodium carbonate, the result of the mixture being a precipitate of one equivalent of basic zinc carbonate and a solution of five equivalents of sodium sulfate. To the latter is added five equivalents of barium sulfid, when there results a precipitate of five equivalents of barium sulfate, leaving a solution of five equivalents of sodium sulfid. The above may be expressed by the following reactons:

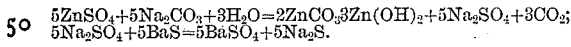

While the sulfid of barium is used as the reagent on account of its cheapness, other soluble salts of the same base can of course be substituted. Thus with barium chlorid we would have the following reaction:

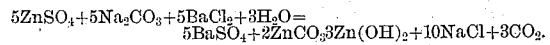

From this it will be observed that the barium chlorid can be added simultaneously with the other reagents, thus precipitating the barium and zinc compounds simultaneously, whereas when barium sulfid is employed it cannot be added until after the precipitation of the zinc as carbonate on account of the danger of the zinc being precipitated as the sulfid, owing to the great affinity between sulfur and zinc.

While I have used barium chlorid as an illustration of one of the modifications of my process, obviously other salts of barium—such as the acetate, nitrate, or hydrate—can be substituted, such substitutions producing, of course, corresponding differences in the compositions of the final solutions. The final solution is drained away, the precipitates washed and thoroughly mixed, freed from the superfluous water by filter-pressing or otherwise, and dried, if desired.

If it is desired that the relative proportion of zinc carbonate to barium sulfate shall be greater than that determined in the first of the above reactions, this can be accomplished by discarding a portion of the alkali-sulfate solution resulting from the reaction between the zinc sulfate and the carbonate and using only sufficient barium solution to react with the diminished sulfate solution. Thus ten equivalents each of zinc sulfate and carbonate can be used, precipitating two equivalents of basic zinc carbonate, forming ten equivalents of sulfate solution, discarding five equivalents of the latter, and using but five equivalents of barium solution, forming five equivalents of barium sulfate precipitate and five equivalents of final solution, the pigment in this case consisting of two equivalents of basic zinc carbonate and five equivalents of barium sulfate. Such equivalent preponderance may be desired where a pigment having relatively more body in oil is desired, it being well known that the zinc constituent has that quality, the barium sulfate being more transparent. It should be remembered that each equivalent of basic zinc carbonate is equal to two equivalents of zinc carbonate plus three equivalents of zinc oxyhydrate—a total of five equivalents of metallic zinc, in combination with carbon, oxygen, and hydrogen. If a relatively less costly pigment is desired, equivalent to one containing a greater proportion of barium sulfate, that can be readily obtained by adding one or more equivalents of a sulfate to the sulfate formed in the reaction referred to and using sufficient barium salt to completely react with the increased quantity of sulfate, thus:

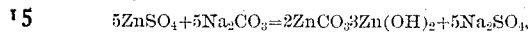

adding five additional equivalents of $Na_2SO_4$, $$10Na_2SO_4 + 10BaS = 10BaSO_4 + 10Na_2S.$$

Where it is desirable to extend the foregoing process to include as an additional constituent the sulfid of zinc, I may add to the final alkali-sulfid solution at the end of the first reaction five equivalents of zinc sulfate, thereby precipitating five equivalents of zinc sulfid and leaving five equivalents of alkali sulfate in solution. This extension of my main process may be expressed by the following reactions:

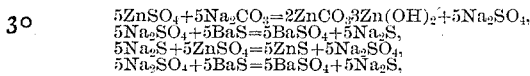

producing, respectively, a mixed precipitate of basic zinc carbonate, barium sulfate, and zinc sulfid after the addition of the final zinc sulfate to the sodium sulfid, and a mixed precipitate of basic zinc carbonate, barium sulfate, zinc sulfid, and again barium sulfate after the addition of the final solution of barium sulfid. These extended pigments when submitted to calcination are converted into zinc oxysulfid and barium sulfate or if submitted to long-continued and sufficient heat the zinc constituent can be freed from all or most of the sulfur.

The determination of the actual quantities of the materials used in the foregoing reactions is a simple stoichiometric problem based upon the atomic weights of the elements constituting any molecule, and as a commercial illustration of the formula contained in the first of the above reactions the following may be cited: I prepare separate aqueous solutions of the following ingredients in the proportions named—viz., zinc sulfate, eight hundred and five (805) pounds; sodium carbonate, five hundred and thirty (530) pounds; barium sulfid, eight hundred and forty-five (845) pounds. The zinc sulfate and sodium carbonate are brought together and five hundred and forty-seven (547) pounds of basic zinc carbonate is precipitated and seven hundred and ten (710) pounds of sodium sulfate remain in solution. To the latter is added the barium sulfid, when eleven hundred and sixty-five (1,165) pounds of barium sulfate are precipitated and three hundred and ninety (390) pounds of sodium sulfid remain in solution, further operations being conducted as already indicated. The three hundred and ninety (390) pounds of sodium sulfid crystallizing with nine (9) molecules of water when evaporated form twelve hundred (1,200) pounds of sodium-sulfid crystals.

It is apparent, of course, that I may invoke the doctrine of chemical equivalents wherever the same is applicable. The term "zinc carbonate" as used in the claims contemplates not only the normal salt, but the basic as well, or either of them or any mixture of the two.

Having described my invention, what I claim is—

1. The process of making pigment which consists in mixing solutions of zinc sulfate, a carbonate of an alkali metal, and a salt of barium incapable at the time of its addition, of precipitating the zinc, and recovering the resulting precipitates, substantially as set forth.

2. The process of making pigment which consists in mixing solutions of zinc sulfate, and a carbonate of an alkali metal, thereby first precipitating the zinc carbonate, then adding the sulfid of barium, and recovering and mixing the precipitates, substantially as set forth.

3. The process of making pigment which consists in mixing solutions of zinc sulfate, and a carbonate of an alkali metal, thereby first precipitating the zinc carbonate, adding the sulfid of barium, and again adding zinc sulfate, and recovering and mixing the several precipitates, substantially as set forth.

4. The process of making pigment which consists in mixing solutions of zinc sulfate, a carbonate of an alkali metal, adding the sulfid of barium, then adding again sulfate of zinc, recovering and mixing the resulting precipitates, and calcining the same, substantially as set forth.

5. The process of making pigment which consists in mixing zinc sulfate with sodium carbonate, thereby first precipitating the zinc carbonate, then adding sulfid of barium and recovering and mixing the precipitates, substantially as set forth.

6. A pigment comprising a mixture of zinc carbonate, barium sulfate, and zinc sulfid, substantially as set forth.

7. A pigment comprising a mixture of the precipitates of zinc carbonate, barium sulfate and zinc sulfid, substantially as set forth.

In testimony whereof I affix my signature in presence of two witnesses.

WILLIAM J. ARMBRUSTER.

Witnesses:
 EMIL STAREK,
 G. L. BELFRY.